US008183855B2

(12) United States Patent
Hornung et al.

(10) Patent No.: US 8,183,855 B2
(45) Date of Patent: May 22, 2012

(54) MEASURING ARRANGEMENT COMPRISING A MAGNET

(75) Inventors: Hans-Georg Hornung, Waal (DE); Michael Sieber, Kaufbeuren (DE)

(73) Assignee: Sensor-Technik Wiedemann GmbH, Kaufbeuren (DE)

( * ) Notice: Subject to any disclaimer, the term of this patent is extended or adjusted under 35 U.S.C. 154(b) by 966 days.

(21) Appl. No.: 12/223,342

(22) PCT Filed: Feb. 1, 2007

(86) PCT No.: PCT/EP2007/000867
§ 371 (c)(1),
(2), (4) Date: Jul. 29, 2008

(87) PCT Pub. No.: WO2007/088053
PCT Pub. Date: Aug. 9, 2007

(65) Prior Publication Data
US 2009/0027044 A1    Jan. 29, 2009

(30) Foreign Application Priority Data
Feb. 2, 2006   (DE) .................... 20 2006 001 807 U (51) Int. Cl.
*G01B 7/14* (2006.01)
*G01B 7/30* (2006.01)
(52) U.S. Cl. ................. 324/207.11; 324/207.2; 324/228; 324/260; 324/262

(58) Field of Classification Search ............. 324/207.11, 324/207.2, 228, 260, 262
See application file for complete search history.

(56) References Cited

U.S. PATENT DOCUMENTS

| 5,477,675 A | 12/1995 | Ingraham et al. |
| 2003/0136443 A1 | 7/2003 | Wain et al. |

FOREIGN PATENT DOCUMENTS

| DE | 197 24 387 | 12/1998 |
| DE | 198 23 529 | 12/1999 |
| DE | 102 29 369 | 1/2003 |
| DE | 103 31 624 | 4/2005 |
| EP | 0 174 914 | 3/1986 |

OTHER PUBLICATIONS

International Search Report dated Mar. 20, 2008, PCT/EP2007/000857.
German Search Report dated Nov. 30, 2006, File No. 202006001807.7.

*Primary Examiner* — Reena Aurora
(74) *Attorney, Agent, or Firm* — Jacobson Holman PLLC (57) ABSTRACT

A measuring arrangement where a magnet moves or is positioned because of the movement or position of an object, and this movement or positioning of the magnet is collected by a sensor, an in particular a non-magnetic dividing wall being provided between the magnet and the sensor. A mechanical converter, in particular a gear, being arranged between the object and the magnet.

17 Claims, 5 Drawing Sheets

MEASURING ARRANGEMENT COMPRISING A MAGNET

FIELD OF THE INVENTION

This is a national stage of PCT/EP2007/000867 filed Feb. 1, 2007 and published in German.

The invention refers to a measuring arrangement for measuring the actual position of an object, for example the piston of a working cylinder. In many cases of mechanical engineering it is interesting to couple the measuring of position directly with the cylinder, and not to be forced to use an additional external measuring apparatus. A frequent reason is that an external measuring apparatus can be damaged easily through the often very rough application conditions. Another reason is that a standard equipping of working cylinders with the measuring means is typically more economical to manufacture than producing and processing separate components.

BACKGROUND OF THE INVENTION

Accumulators have become known where a piston moves up and down in a housing. Hall sensors outside the housing arranged in a pocket projecting in the interior space of the piston switch on or off a motor via an electric module, depending on the position of the piston.

It is here in particular difficult that in, for example hydraulic cylinders, relatively aggressive oil and typically large pressures occur which make the use of electronic equipment difficult, and that the information about the position has to be carried out through a pressure-resistant wall. Additionally, also the electronic equipment in the interior has to be supplied in some way with electric power.

SUMMARY OF THE INVENTION

Coming from this state of the art it is an object of the invention to suggest a measuring arrangement which can also be used in closed spaces, for example in a pressurised interior space of a working cylinder.

In order to solve this problem the invention comes from a measuring arrangement where a magnet moves or takes a position because of the movement or the position of an object, and this movement or position of the magnet is collected by a sensor. Between magnet and sensor, in particular, a non-magnetic dividing wall is provided. Between the object and the magnet a mechanical converter, in particular, a gear, is arranged.

The dividing wall is here for example the limiting wall of a closed space, for example a pressurable interior space of a working cylinder. The magnetic field lines penetrate the dividing wall, and a change of the density of the magnetic field lines or the strength of the magnetic field, for example by the movement or positioning of the magnet, is recorded accordingly, for example, by a sensor arranged on the outside of the dividing wall. Here the value to be measured is turned into a suitable way in a movement or positioning of the magnet. An advantage of the arrangement is here that for the magnet arranged in the interior no power supply is necessary. That means the limiting wall of the interior remains undamaged because of that. As the sensor is arranged on the outside of the dividing wall, by means of that the corresponding sensor lines do not damage the dividing wall either. Conveniently non-magnetisable material is provided for the dividing wall so that the measuring process is not falsified by magnetisable material of the dividing wall.

In contrast to the state of the art by means of the invention not a mere connection method is provided, but a measuring device by means of which the position of an object is measured relatively to a sensor. The invention makes it now possible to carry out a definition of the position of the object. This definition of the position is done continuously. In addition to that the invention, however, makes it possible to define the movement of the object, that means, for example its local position change in a time interval, that means its speed. The invention makes it even possible to determine the speed of the object depending on its respective position. Thus also theoretical measurements of acceleration are possible through the invention.

According to the invention in particular only one sensor is provided by means of which the position of the object can be determined. This sensor measures continuously the change of the magnetic field strength which is the result of the changed position of the magnet relatively to the sensor. The invention is not limited to the use of one sensor. Basically it is possible according to another arrangement of several sensors, also according to the invention, if necessary also in combination with several moved magnets, to design the definition of the position or the data collection even more accurately.

For a space-saving arrangement of the measuring arrangement a mechanical converter is provided which transfers the movement of the object to the magnet. With such a converter the movement of the object can be deflected in another direction or a linear movement along a first axis in a linear movement along a second axis arranged swivelled compared with the first axis.

A linear movement can also be changed into a rotational movement or vice versa a rotational movement into a linear movement. Besides, with a mechanical converter also a step-down or step-up gearing of the movement can be achieved so that, for example, a small movement of the object leads to a larger movement of the magnet. Thus the accuracy of the measurement can be increased as a large change of the magnetic field at the sensor leads to a larger electric output signal. Vice versa a large change of position of the object, which is possibly larger than the dimensions of the sensor or its effective length can be geared down in such a way that it still can be collected by the sensor.

By means of a mechanical converter—as suggested with the invention—the measuring arrangement can be used very variably. It can be used in spaces with large as well as with very small dimensions. The measuring arrangement can be used very space-saving.

The measuring arrangement is in particular provided for measuring a length, a distance or a spacing or the change of the length, the distance or the spacing. Coming from a basic position indicated as 0 the change of the position of an object is measured. For example the position of a piston in a working cylinder has to be determined from an upper dead center to a bottom dead center, however, also all positions of the piston between upper and bottom dead center being able to be measured. For this purpose the piston is, for example, connected with a magnet, the change of the position of the piston changing also the position or location of the magnet proportionally. The change of the strength of the magnetic field lines is measured by a sensor which transfers the measured value electrically to a display or an evaluation unit.

For measuring the position of the magnet, for example, inductive or magnetic proximity switches are provided. For magnetic proximity switches Reed switches or Hall sensors are particularly suitable, in contrast to Reed switches, which open or close an electric circuit depending on the position of the magnet, the Hall sensor indicates the change of the magnetic field continuously.

The sensor can be arranged on the side of the dividing wall opposite the magnet as a discrete component, for example in an individual housing. According to another modification of the invention it is provided to glue the sensor directly to the outside of the dividing wall.

Fastening the sensor to the dividing wall of the housing by gluing is a very simple and economical way of manufacturing. It is, however, also possible, to set the sensor in a recess provided with undercuts. Furthermore the sensor may be fastened to the housing or the dividing wall by clamps. This is only a small list of fastening means of the sensor. Other fastening possibilities which are not listed here are also comprised by the idea of the invention.

According to another modification the sensor is deposited in thin-film technology on the outside of the dividing wall, the sensor being deposited to the outside of the dividing wall by evaporation, sputtering, ion plating or other known techniques for depositing thin-films.

Depositing the sensor in thin-film technology has the advantage that the sensor is connected with the housing or the dividing wall unreleasably. This is a reliable and easily manufactured way of fastening a sensor to an object.

On the one hand the housing on which the sensor is arranged can be made of non-magnetic material. For that purpose advantageously aluminium is provided, however, also other non-magnetic materials are suited like non-magnetic metals, other non-magnetic materials or even synthetic materials.

According to another embodiment of the invention it is provided to produce the housing where the measuring arrangement is arranged of a non-magnetic material.

According to the invention it is provided here that a rotational as well as a linear movement of the magnet can be used. The value to be measured is here conveniently turned by a mechanical converter, for example a gear, into a rotational or longitudinal or linear movement of the magnet. The advantage of the application of a rotational movement is here in particular that such a design saves space as with a multiple rotation of the magnet no additional space is required, but a large measuring range is offered.

In a preferred modification of the invention a so-called cable pull sensor is used. This cable pull sensor comprises a cable pull arrangement, the cable of this cable pull arrangement being connected with one end with the object the position of which has to be determined, and the second cable end moving the magnet or positioning it. For determining the position of an object it is, of course, also possible to determine the distance or the space of this object from a reference point. The change of the active cable length is turned directly or by using a step-down or step-up gearing into the movement of the magnet. Without the corresponding mechanic-electronic signal converter their use in the interior of hydraulic cylinders is possible as they can be made of materials which are sufficiently resistant against the oil and the pressure, and because they require no (or only the slightest) additional energy for their operation. In order to transfer the information about the position now from the pressurised space to the outside a magnet is attached to the signal axis of the cable pull sensor which usually operates directly the mechanic-electronic signal converter, and the field of this magnet is collected and evaluated by a suitably thin, however pressure-sealed, wall piece of the dividing wall of non-magnetisable material from outside the pressurised space.

The solution according to the invention is characterised in that it transfers the information about the position without a pressure-sealed rotation passage or a pressure-sealed cable passage or a contact-less electro-magnetic energy and signal transfer from the pressurised space to the outside, that the exact collection of the magnet rotation position is possible without any problems by means of magnetic field sensors, which are generally available, and that the components in the interior resist easily the special conditions of the hydraulic.

In order to increase in this process the definition of the measurement the cable pull sensors can be used with several rotations of the axis for the entire measuring length, and the rotations can also be counted. This has the disadvantage that the absolute position cannot be collected directly, but only changes, however, those require little effort. Instead of cable pull sensors with one axis those with several axes can be used according to several magnets and according several magnet rotational position sensors, so that the position of the single axes of the step-down gear of the winding-up arrangement each can be collected absolutely individually and thus, like with a conventional mechanical watch, a very high definition for a large measuring range is possible.

Besides the embodiment just described, using a cable pull arrangement, in particular as a mechanical converter, for moving, also a pulley block, a deflection arrangement, a telescope rod, a lever arrangement or a combination of two or more of the mentioned means are provided. The cable pull arrangement just described acts via a gear in order to transfer the movement of the object with a stepping-down or stepping-up to the movement of the magnet. The gear may consist of a toothed gearing which effects a simple stepping-down or stepping-up of the movement of the object to the movement of the magnet. The toothed gearing itself, however, can effect also a deflection of the linear movement into a rotational movement with simultaneous stepping-up or stepping-down or even without any.

According to another embodiment a telescope rod is provided which turns the linear movement of the object into a linear movement of the magnet. The telescopic lift effects a stepping-down or stepping up.

According to another arrangement a rod is provided with a gearing so that the gearing, for example, makes the magnet move rotationally via a bevel wheel. The pulley block also is suited as a transmission gear. A large position change of the object leads, depending on the pulleys, to a smaller position change of the magnet, or in a vice versa arrangement of the pulley block, a small position change of the object to a large position change of the magnet. Furthermore, lever arrangements for transferring the movement of the object to the movement of the magnet are provided.

In the cable pull sensor mentioned before it is provided that the measuring arrangement is arranged rectangular to the movement of the object which has to measured. A shaft the axis direction of which is angled relatively to the direction of movement of the object is caused to move via the cable pull.

According to another embodiment of the invention, however, it is provided to arrange the measuring arrangement in one line in alignment to the direction of movement of the object. For that purpose, for example, the cable of the cable pull sensor is deflected via a deflection roller or another deflection element (for example a shaft or eye or the like) so that the axis of the shaft is orientated parallel to the direction of movement of the object. In the embodiment of the invention where the measuring arrangement is arranged in the cylinder of a working cylinder at the front side of the working cylinder the dividing wall consisting of non-magnetizable material is provided. Behind this dividing wall, in the interior of the cylinder, the arrangement is provided which causes the magnet to move rotationally. This can be carried out via the described mechanical converter, for example a gear consisting of several toothed wheels, which causes the direction of movement of the object to move rotationally, via cable pull arrangements, deflection or lever arrangements. The simplest design is the cable pull arrangement which also comprises the pulley block arrangement described before where the cable connected with the piston is guided over a deflection roller of the deflection arrangement. The deflection element or the deflection roller is conveniently provided outside the center of the cylinder so that the axis of the shaft which makes the magnet move rotationally coincides with the axis of the cylinder. However, according to another embodiment of the invention the measuring arrangement itself is arranged eccentrically at the front side of the cylinder, here, if necessary, the axis of the deflection roller being arranged rectangular to the longitudinal axis of the working cylinder, and the center point of the deflection roller being on the longitudinal axis of the cylinder.

Advantageously the measuring arrangement according to the invention is provided with a thread. Thus the measuring device can be screwed in a device as a pre-fabricated component.

The measuring arrangement is in particular provided for measuring the position of the piston in a working cylinder, the measuring device consisting of a mechanical converter. This mechanical converter consists, as described before, of a gear as step-up or step-down gear, as a cable pull arrangement, the transmission of the cable pull being provided in a ratio of 1:1, as a pulley block arrangement, here a step-up or step-down ratio being provided, as a deflection arrangement which turns the linear movement into a movement deviating from the direction of movement of the object. Furthermore a telescope rod may be provided which guides the movement of the object to the movement of the magnet. Also a lever arrangement is provided so that the movement of the object is transferred to the magnet. A combination of several of these transmission devices is also comprised by the invention.

According to a preferred embodiment the linear movement of the piston is transferred into a rotational movement of the magnet. This rotational movement effects a change of the magnetic field compared with the position of a sensor which is arranged outside the pressurized space and sensitive to the direction of the magnetic field. In order not to impair the magnetic field the housing surrounding the mechanical converter and the magnet is made of a non-magnetizable material, the housing in particular in the region of the magnet and of the sensor arranged at the outside compared with the rest of the wall of the housing being shaped thinner. According to another modification of the invention it is, however, provided to design the housing of a material like iron, which is magnetizable. However, at least the region where the magnet and the sensor are arranged is formed of a non-magnetizable dividing wall. The (non-magnetizable) dividing wall is arranged in the exterior wall of the housing in such a way that it can resist, if necessary, even high pressure.

The invention does not only comprise a measuring arrangement as described, but it comprises in the same way also a working cylinder, in particular a lifting cylinder which has such a measuring arrangement as described. Here it is provided conveniently that the working cylinder is realized as an hydraulically or pneumatically acting working cylinder, the parts of the measuring arrangement provided in the interior of the working cylinder being advantageously also resistant against high pressure or temperature or aggressive pressure media.

A hydraulically or pneumatically acting working cylinder is provided as a working cylinder. This working cylinder has high pressure inside. In particular the hydraulic oil in a hydraulic cylinder is rather aggressive. A simple mechanical transmission of the movement of the piston to a magnet, be it a linear or rotational movement, is not impaired by the aggressive oil. The working cylinder itself may consist of non-magnetizable material, the field lines coming from the magnet penetrating the dividing wall undisturbed.

According to another embodiment, however, a working cylinder of magnetisable material is provided. In this case at least the region where the magnet and the sensor are opposite each other a dividing wall of non-magnetisable material is arranged. Thus the magnetic field is prevented from being disturbed.

According to an embodiment the dividing wall is arranged in the bottom of the cylinder, according to another embodiment in the side wall. In the arrangement of the dividing wall in the side wall of the cylinder the shaft on which the cable pull can be wound up is arranged orthogonal to the direction of movement of the piston. The shaft converts the linear movement of the piston in a rotational movement of the magnet.

A clamping device effects that the cable is tensioned permanently. This clamping device consists of, for example, a flat spiral spring, which exercises on the shaft a rotational moment, which acts in opposite direction of the rotation of the shaft which is caused by a pull on the cable. If the piston approaches the shaft the flat spiral spring has the effect that the cable is wound up on the shaft. A movement of the piston in an opposite direction of this direction effects an unwinding of the cable from the shaft against the force of the spring of the flat spiral spring.

In the arrangement of the dividing wall at the front side of the working cylinder the axis of the shaft and the direction of movement of the piston are arranged parallel to each other. In order to be able to cause the shaft to move rotationally a deflection arrangement is provided. This deflection arrangement consists, for example, of a deflection roller, across which the cable makes the shaft move rotationally. The axis of the shaft and the longitudinal axis of the working cylinder can be in alignment, according to an embodiment of the invention. According to another example the two axes are arranged to each other staggered.

Other advantageous embodiments are mentioned in the sub-claims.

BRIEF DESCRIPTION OF THE DRAWINGS

In the drawings the invention is shown schematically.
In the figures.

DETAILED DESCRIPTION OF THE PREFERRED EMBODIMENTS

The measuring arrangement is shown in example in a working cylinder 3 also comprised by the invention. The use of the measuring arrangement 1 according to the invention, however, is not restricted to this case of application.

Figure 1:
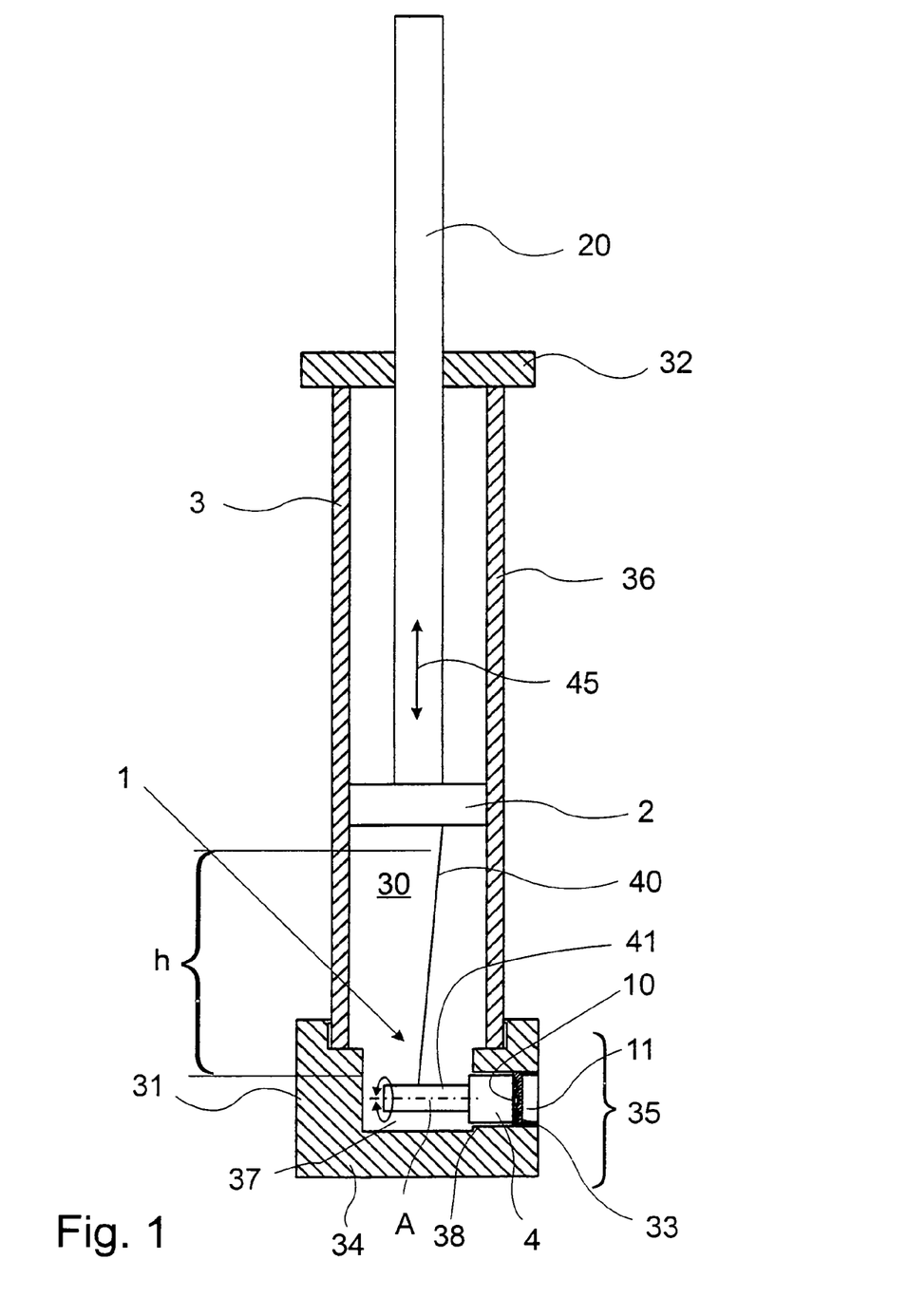
FIG. 1 and FIG. 4: each in a side view a modification of the working cylinder according to the invention, using the measuring arrangement according to the invention.

The working cylinder 3 consists of a cylinder wall 36 on the inside of which a piston 2 is guided movably (see double arrow 45). The piston 2 carries at its front end a piston rod 20 projecting through a boring in the lid 32 out of the working cylinder 3 and also being guided here. On the side of the piston 2 opposite the piston rod 20 there is the pressurised space 30. The connection piece for introducing the medium which can be pressurised, because of which the piston 2 is moved, is not shown for clearness purposes.

The invention is shown here at a working cylinder 3 working one-sided. This does not restrict the invention to this case of application. Of course, the invention can be applied in the same way with a working cylinder operated two-sided.

At the bottom side the working cylinder 3 is sealed by the cylinder closing which also forms the cylinder bottom 34. It is clear that in the space 30 a considerable pressure arises so that a suitable sealing of the cylinder has to be taken care of.

In different applications now, for example, the actual position of the piston 2, that means its location, is important. When the length of the piston rod 20 is known then, for example, the position of a corresponding element which can be operated by the working cylinder can be concluded.

In order to determine this length or the distance of the piston 2 from the upper edge of the cylinder bottom 34 it is now suggested that a magnet 10 is moved or positioned because of the dimension which has to be measured, and this movement or positioning is collected by a sensor 11. Thus it is possible, if for example the piston 2 in a starting position is located at the upper edge of cylinder bottom 34, to measure the lifting h of the piston 2. This can be carried out, for example, by counting the rotations of the magnet 10 (as in a stepping motor), or by determining the magnetic field power. It is possible here to determine the relative change of position, for example by movement of the magnet (rotation or linear movement) as well as the absolute position by measuring the magnetic field. For that purpose the end of a cable 40 is connected to the piston 2. The cable 40 is wound up or off a shaft 41, depending on the direction of the movement of the piston 2. The shaft 41 is supported rotatably around its axis in a gear 4. The gear 4 carries at its descending side a magnet 10 which is caused to rotate because of the movement of the piston 2. The rotation of the magnet 10 leads to a change of the magnetic field lines which are recorded by a sensor 11 arranged on the outside of the working cylinder 3. Also on the outside the additional evaluation electronic means is provided which, for example, determines and evaluates the angular position of the magnet 10 or also the number of rotations of the magnet 10. Starting from here it is calculated backward which lifting length h corresponds to it.

The invention is not restricted here to the fact that these only work in the dynamic region. With a suitably sensitive design it is also possible to carry out an absolute measurement, that means not by running back of the piston 2 to its starting position at the cylinder bottom 34.

It is convenient here that between the magnet 10 and the sensor 11 a pressure-sealed and preferably non-magnetisable dividing wall 33 is provided. The dividing wall 33 is here, for example, formed in one piece of the side wall of the cylinder or the bottom of the cylinder, or it is set in as a separate component in a suitable recess, and for example welded or glued sealed, or connected in any other suitable way.

The cylinder bottom 34 has, in the modification shown here, a certain height. A pocket 37 is provided in the bottom 34 of the cylinder in which the gear 4 carrying the shaft 41 holding the cable 40 projects. The gear 4 is set in a recess 38 in the side wall 35 of the cylinder bottom 34 on the inside facing the pocket 37. This recess 38 is limited by the dividing wall 33. In a suitable way between gear 4 and dividing wall 33 the magnet 10 is arranged, in such a way that it is, first of all, moved because of the position of the piston 2 in the working cylinder 3, or after that positioned, and this movement or the positioning is recorded and detected by the sensor 11 arranged on the outside of the dividing wall 33, opposite the pocket 37.

In the example shown here the axis A of the shaft 41 is orientated rectangular to the piston rod 20. Thus no essential problems will arise during winding up or off the cable 40 to the shaft 41, conveniently the cable 40 is pulled away from the shaft 41 while the piston 2 is pressed out against the force of a spring not shown here.

Instead of the design shown here, where the gear 4 is built in an accordingly thicker cylinder bottom 34, it is, of course, also possible to arrange the dividing wall 33 actually in the cylinder wall 36. Either modification has advantages in the production of such a cylinder.

Figure 4:
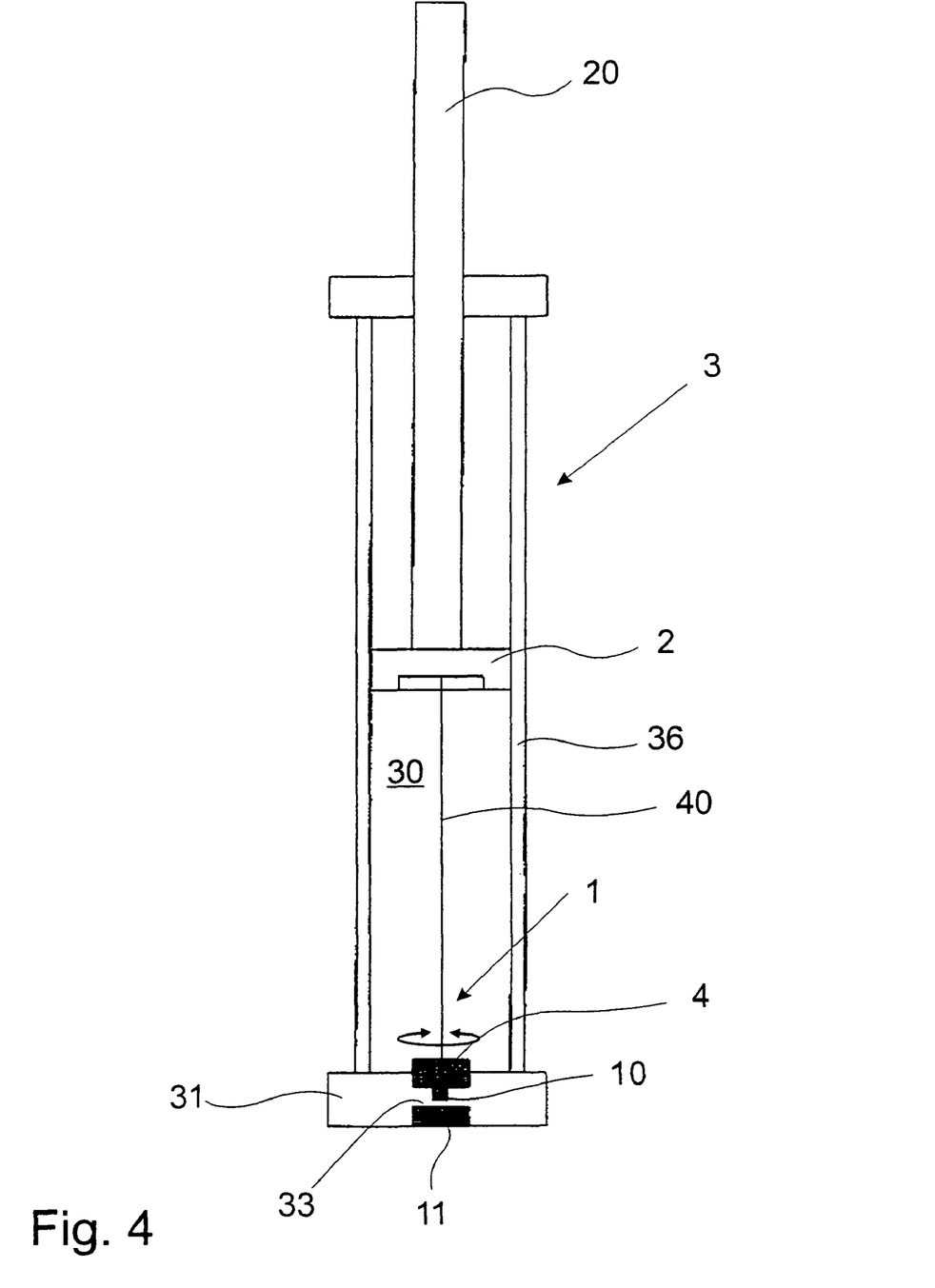

The modification according to FIG. 4 is designed in such a way that the shaft of the gear 4 is arranged parallel to the longitudinal extension of the piston rod 20. While in FIG. 1 the sensor is at the side, in the extension of the cylinder wall 36, it is provided in the embodiment according to FIG. 4 on the bottom side of the cylinder closing 31 or in the cylinder bottom 34.

Figure 2:
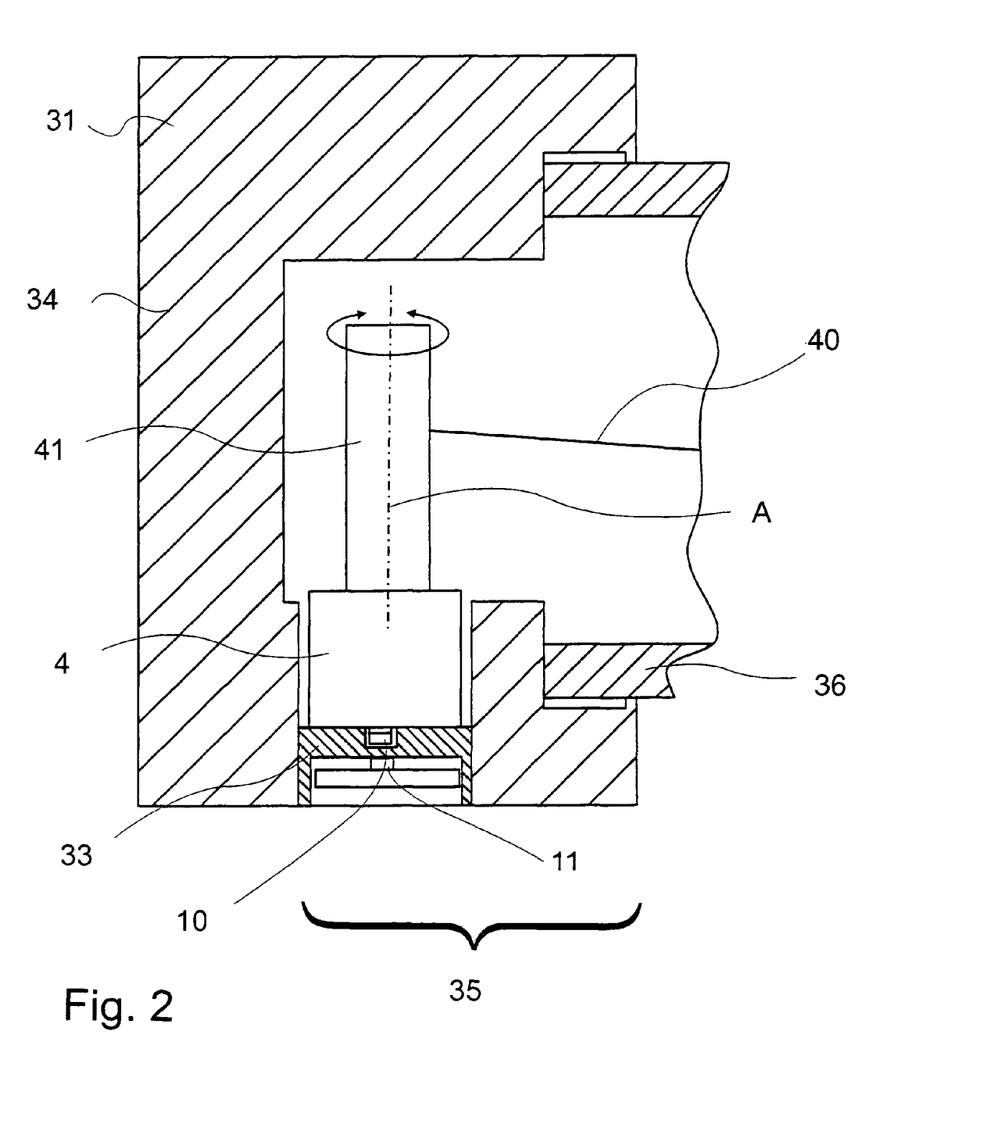
FIGS. 2, 3, 5: each in a detail of different variants of realization of the measuring arrangement according to the invention.

In FIG. 2 the modification according to FIG. 1 is shown in an enlarged detail. The cable 40 is wound up and off the shaft 41 orientated rectangular to the piston rod 20. By means of that the shaft 41 is caused to rotate, and also the position of the magnet 10 changes. This is detected by the sensor 11. The entire arrangement is built in the side wall 35 of the cylinder closing 31. By means of a flat spiral spring which acts against the tensile force of the piston 2 the cable 40 is held under tension.

Figure 3:
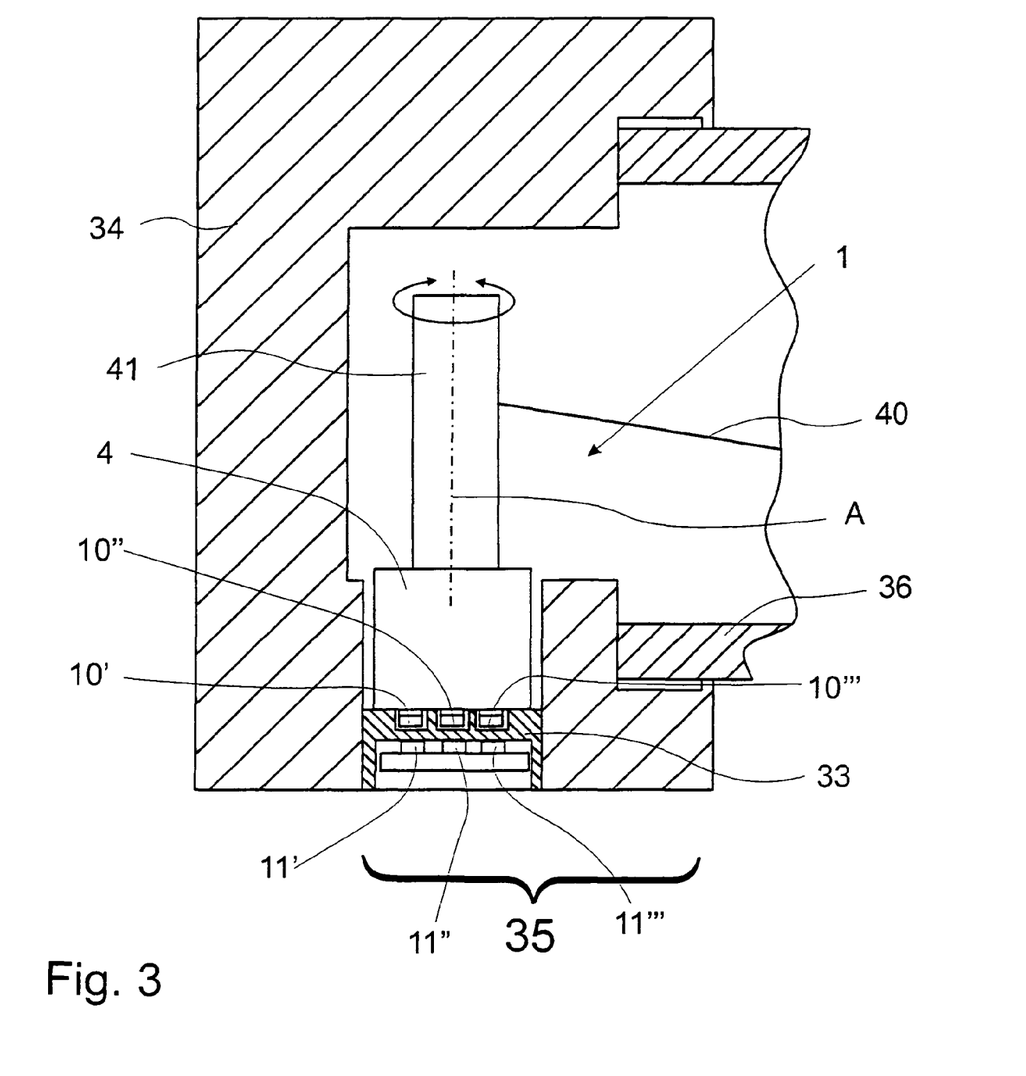

The modification shown in FIG. 3 is almost identical with the one shown in FIG. 2. However, on the side of the drive here in the gear 4 not one magnet 10 but altogether three magnets 10', 10" and 10'" are moved or positioned accordingly. The magnets 10', 10" and 10'" here interact with altogether three magnet rotational position sensors 11', 11" and 11'" so that the position of the single axes of the step-down gear of the winding-up device each can be collected individually, and thus a very high definition is possible for a large measuring range.

Figure 5:
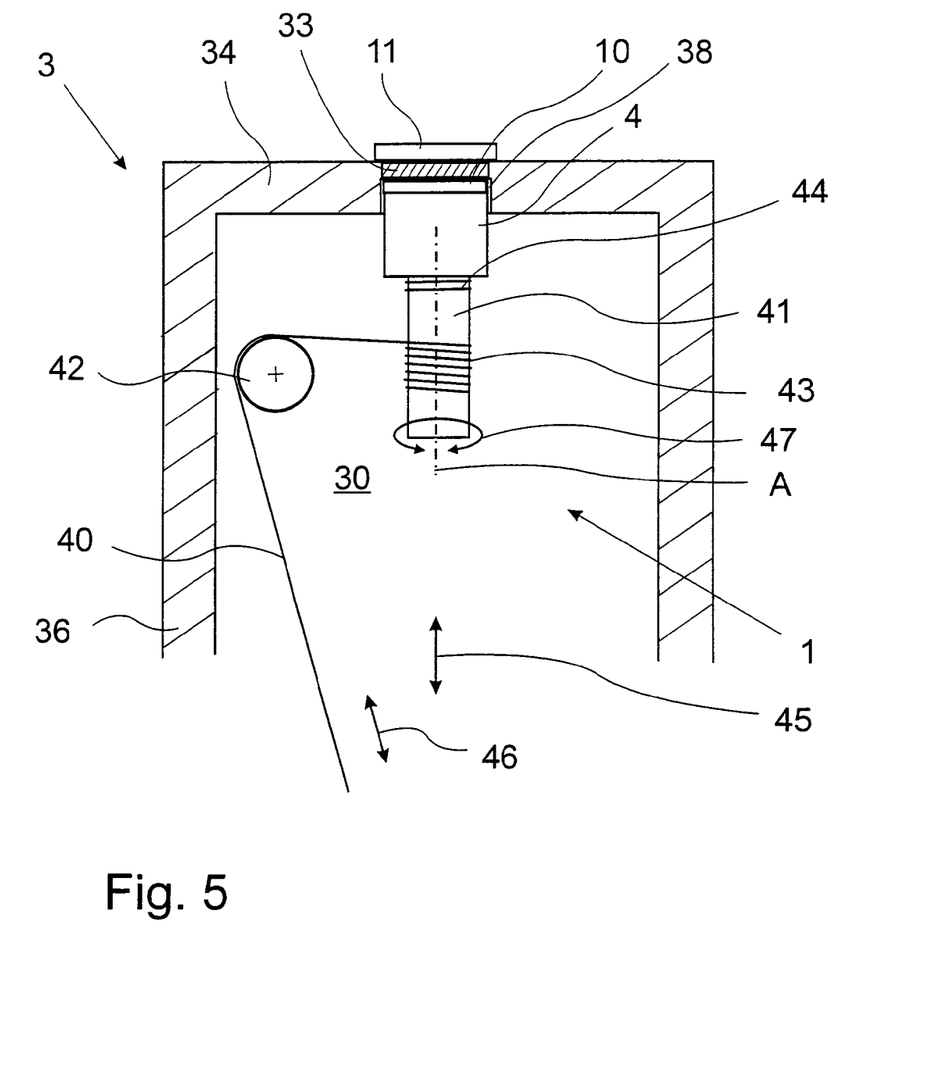

In FIG. 5 a measuring arrangement 1 is shown which is arranged in the cylinder bottom 34 of the working cylinder 3. The axis A of the shaft 41 coincides in this example with the longitudinal axis of the working cylinder 3. In the bottom 34 of the working cylinder 3 a boring is provided. In this boring a dividing wall 33 consisting of non-magnetisable material is set in. The fastening of the dividing wall 33 is carried out in such a way that it can resist the high pressure existing in the working cylinder.

The wall thickness of the dividing wall 33 is less than the wall thickness of the cylinder bottom 34. In the recess 38 in the cylinder bottom 34 the gear 4 is set in serving for stepping-up or stepping-down the rotational movement of the shaft 41, and transferring this rotational movement to the magnet 10. The magnetic field lines of the magnet 10 are measured by the sensor 11 and transferred to a display or the like. At the shaft 41 a clamping device 44 is provided which is designed in this example as a flat spiral spring. This clamping device 44 effects that the cable 40 is tensioned permanently between shaft 41 and piston 2.

The mobile piston (not shown) in this example moves in the direction of the double arrow 45 toward the sensor 11 or away from it. Via a cable pull arrangement consisting of a cable 40 and a deflection roller 42 this movement is deflected along the longitudinal axis of the working cylinder 3. In this way it is possible to turn a linear movement into a rotational movement by the fact that the end of the cable is connected with a shaft 41, the longitudinal axis of the shaft 41 being orientated parallel to the longitudinal axis of the working cylinder 3 or the direction of movement 45 of the piston. When the piston moves toward the sensor 11 the cable 40 is shortened because it is wound up on the shaft 41. A clamping device 44 effects the rotational movement of the shaft. Simultaneously with the shaft 41 via a gear 4 the sensor 11 is caused to move rotationally 47. By means of that the magnetic field changes. This change is collected by the sensor 11 and passed on to a display.

Through the pull at the piston this movement is transferred to the cable 40 along the arrow 46, the cable 40 connected with the shaft 41 being wound off from the coil against the (spring) force of the clamping device 44. Now a rotational movement 47 is presses on the magnet 10 in opposite direction. Again the magnetic field changes which is collected by the sensor 11. With this arrangement a very space-saving device of the measuring arrangement is provided which is provided in closed spaces, for example in a working cylinder.

By means of a sensor 11, which is designed accordingly, it is even possible to detect the direction of rotation of the magnet 10, so that also the direction of movement of the piston or the object can be determined.

By means of the invention therefore a direction-sensitive, exact position measuring arrangement is made available which furthermore also offers the opportunity of defining the speed and even the acceleration of the object with reference to the position and with reference to the sensor.

The claims filed with the application now and to be filed later are attempted formulations without prejudice for obtaining a broader protection.

If here, on closer examination, in particular also of the relevant prior art, it turns out that one or the other feature may be convenient for the object of the invention, however, not decisively important, of course, already now a formulation is striven for which does not contain anymore such a feature, in particular in the main claim.

References in the sub-claims relate to the further design of the matter of the main claim through the characteristics of the respective sub-claim. These are, however, not to be understood as a waiver of independent protection of the matter for the characteristics of the referred sub-claims.

Characteristics only disclosed in the description so far may now, in the course of proceedings, be claimed as being of inventive relevance, for example to distinguish from the state of the art.

Characteristics only disclosed in the description or even single characteristics from claims which comprise a variety of characteristics may be used at any time to distinguish from the state of the art in the first claim, and this is even if such characteristics have been mentioned in connection with other characteristics, or achieve particularly convenient results in connection with other characteristics.

The invention claimed is:

1. Measuring arrangement comprising
    a magnet moving or taking a position because of a movement or a position of an object, said movement or position of the magnet being collected by a sensor,
    the magnet being arranged in a closed space formed by an interior space of a working cylinder,
    a non-magnetic dividing wall located between said magnet and said sensor, and
    a mechanical converter including a gear located between the object and the magnet, the sensor being arranged on a side of the dividing wall opposite to the magnet.

2. The measuring arrangement according to claim 1, wherein inductive or magnetic proximity switches measure movement of the magnet.

3. The measuring arrangement according to claim 1, wherein the sensor is sensitive to magnetic field rotation or linear movement.

4. The measuring arrangement according to claim 1, wherein the sensor is arranged as a discrete component or the sensor is a thin-film technology component.

5. The measuring arrangement according to claim 1, wherein the gear is a step-up or step-down gear.

6. The measuring arrangement according to claim 1, wherein the mechanical converter includes a cable pull arrangement, and one end of a cable of the cable pull arrangement is connected with the object, the position of which has to be determined, and a second end of the cable moves or positions the magnet.

7. The measuring arrangement according to claim 6, wherein the mechanical converter includes a deflection pulley for the cable.

8. The measuring arrangement according to claim 6, wherein the gear has a shaft supporting the second end of the cable and the shaft rolling up or off the cable.

9. The measuring arrangement according to claim 6, wherein the gear has a shaft, and an axis of the shaft is orientated parallel, angled or rectangular to a direction of movement of the object.

10. The measuring arrangement according to claim 1, wherein the mechanical converter includes a cable pull arrangement with a cable and a clamping device for the cable.

11. The measuring arrangement according to claim 1, wherein the gear has a shaft, and the shaft causes the magnet to execute a rotational movement.

12. Working cylinder designed as a lifting cylinder with a measuring arrangement, said working cylinder comprising
    a magnet moving or being positioned because of a movement or a position of an object, the magnet being arranged in a closed interior space, and the movement or positioning of the magnet being collected by a sensor,
    a non-magnetic dividing wall located between the magnet and the sensor, and
    a mechanical converter including a gear located between the object and the magnet, and the sensor being arranged on a side of the dividing wall opposite to the magnet.

13. The working cylinder according to claim 12, wherein the measuring arrangement is arranged, with the exception of the sensor, in an interior of a pressurized space of the working cylinder.

14. The working cylinder according to claim 12, wherein the dividing wall is part of a cylinder.

15. The working cylinder according to claim 12, wherein the dividing wall is arranged in a bottom of a cylinder.

16. The working cylinder according to claim 12, wherein the gear includes a shaft, and an axis of the shaft is orientated parallel, angled or rectangular to a longitudinal extension of a piston rod.

17. The working cylinder according to claim 16, wherein a deflection pulley is provided for a cable of a cable pull arrangement in an interior of the working cylinder at an end of the working cylinder opposite the piston rod.

* * * * *